(12) United States Patent
Bhavnagari et al.

(10) Patent No.: US 11,283,196 B2
(45) Date of Patent: Mar. 22, 2022

(54) ACTIVE ANTENNA SYSTEM FOR DISTRIBUTING OVER THE AIR CONTENT

(71) Applicant: AVX Antenna, Inc., San Diego, CA (US)

(72) Inventors: Dhaval Bhavnagari, San Diego, CA (US); Aravind Dhulipalla, San Diego, CA (US); Sebastian Rowson, San Diego, CA (US); Abhishek Singh, San Diego, CA (US)

(73) Assignee: AVX Antenna, Inc., San Diego, CA (US)

( * ) Notice: Subject to any disclaimer, the term of this patent is extended or adjusted under 35 U.S.C. 154(b) by 0 days.

(21) Appl. No.: 16/910,536

(22) Filed: Jun. 24, 2020

(65) Prior Publication Data

US 2020/0412026 A1    Dec. 31, 2020

Related U.S. Application Data

(60) Provisional application No. 62/954,135, filed on Dec. 27, 2019, provisional application No. 62/868,294, filed on Jun. 8, 2019.

(51) Int. Cl.
*H01Q 3/44* (2006.01)
*H04B 1/00* (2006.01)
(Continued)

(52) U.S. Cl.
CPC ............ *H01Q 25/04* (2013.01); *H01Q 5/385* (2015.01); *H01Q 25/002* (2013.01)

(58) Field of Classification Search
CPC ...... H01Q 25/002; H01Q 25/00; H01Q 25/04; H01Q 5/37; H01Q 5/378; H01Q 5/38;
(Continued)

(56) References Cited

U.S. PATENT DOCUMENTS 6,765,536 B2    7/2004  Phillips et al.
6,987,493 B2    1/2006  Chen
(Continued)

FOREIGN PATENT DOCUMENTS

WO    WO 2011/000090    1/2011

OTHER PUBLICATIONS

International Search Report and Written Opinion for Application No. PCT/US2020/039271, dated Oct. 13, 2020, 10 pages.

*Primary Examiner* — Tho G Phan
(74) *Attorney, Agent, or Firm* — Dority and Manning, P.A.

(57) ABSTRACT

Systems and methods for distributing over the air (OTA) content are provided. In one example, an antenna system can include a network access point. The antenna system can include an OTA antenna system configured to receive an OTA signal associated with media content. The OTA signal can be a VHF signal or a UHF signal. The OTA antenna system can be coupled to the network access point via a universal serial bus (USB) connection. The access point can be configured to perform operations, including receiving a signal associated with the media content from the OTA antenna system via the universal serial bus connection; and communicating media content via a network communication link to one or more client devices. The OTA antenna system can include a modal antenna configurable in a plurality of antenna modes. Each antenna mode can be associated with a distinct radiation pattern or polarization.

19 Claims, 9 Drawing Sheets

(51) Int. Cl.
  *H01Q 25/04*     (2006.01)
  *H01Q 5/385*     (2015.01)
  *H01Q 25/00*     (2006.01)

(58) Field of Classification Search
  CPC .......... H01Q 5/385; H01Q 1/24; H01Q 21/24;
      H01Q 3/24; H01Q 3/247; H01Q 3/44;
      H01Q 9/42; H01Q 9/16; H04B 1/00;
      H04B 7/04; H04B 7/06; H04B 7/08;
      H04B 7/10; H04B 15/00; H04B 17/00;
      H04W 8/24; H04W 8/245; H04W 12/08
  See application file for complete search history.

(56) References Cited

U.S. PATENT DOCUMENTS

| | | | |
|---|---|---|---|
| 7,068,234 B2 | 6/2006 | Sievenpiper | |
| 7,215,289 B2 | 5/2007 | Harano | |
| 7,830,320 B2 | 11/2010 | Shamblin | |
| 7,911,402 B2 | 3/2011 | Rowson et al. | |
| 8,362,962 B2 | 1/2013 | Rowson et al. | |
| 8,446,318 B2 | 5/2013 | Ali et al. | |
| 8,648,755 B2 | 2/2014 | Rowson et al. | |
| 8,717,241 B2 * | 5/2014 | Shamblin | H01Q 1/243 343/702 |
| 9,065,496 B2 * | 6/2015 | Rowson | H04B 7/10 |
| 9,231,669 B2 | 1/2016 | Desclos et al. | |
| 9,240,634 B2 | 1/2016 | Rowson et al. | |
| 9,425,497 B2 | 8/2016 | Pajona et al. | |
| 9,439,151 B2 | 9/2016 | Zhu et al. | |
| 9,478,863 B2 * | 10/2016 | Kanj | G06K 19/07779 |
| 9,479,242 B2 | 10/2016 | Desclos et al. | |
| 9,590,703 B2 | 3/2017 | Desclos et al. | |
| 9,755,305 B2 | 9/2017 | Deslos et al. | |
| 9,755,580 B2 | 9/2017 | Desclos et al. | |
| 9,913,130 B2 | 3/2018 | Brisebois et al. | |
| 10,135,499 B2 * | 11/2018 | Stratigos, Jr. | H04B 1/0003 |
| 10,251,072 B2 * | 4/2019 | Cariou | H04W 16/28 |
| 10,374,674 B2 * | 8/2019 | Lee | H04B 7/0417 |
| 10,511,093 B2 * | 12/2019 | Shamblin | H01Q 3/247 |
| 10,601,491 B2 * | 3/2020 | Natarajan | H04B 7/0874 |
| 10,624,044 B1 * | 4/2020 | Marupaduga | H04W 52/367 |
| 2013/0042281 A1 | 2/2013 | Buff et al. | |
| 2016/0002772 A1 | 9/2016 | Uyehara et al. | |
| 2018/0131990 A1 | 5/2018 | Desclos et al. | |

\* cited by examiner

| Channel | Detection Status 610 | Model 1-CQ1 | Model 2-CQ1 | ... | Model N-CQ1 | Channel Weight 630 |
|---|---|---|---|---|---|---|
| 1 | NO | 0 | 0 | | 0 | 0 |
| 2 | YES | 28 | 29 | | 29 | 0.25 |
| 3 | YES | 15 | 17 | | 16 | 1 |
| ⋮ | | | | | | |
| M | YES | 13 | 18 | | 17 | 1 |
| | | $S_n=125$ | $S_n=131$ | | $S_n=127$ | |

ACTIVE ANTENNA SYSTEM FOR DISTRIBUTING OVER THE AIR CONTENT

PRIORITY CLAIM

The present application claims the benefit of priority of U.S. Provisional Application Ser. No. 62/954,135, titled "Active Antenna System for Distributing Over the Air Content," filed on Dec. 27, 2019, which is incorporated herein by reference for all purposes. The present application claims the benefit of priority of U.S. Provisional Application Ser. No. 62/868,294, titled "Active Antenna System for Distributing Over the Air Content," filed on Jun. 28, 2019, which is incorporated herein by reference for all purposes.

FIELD

The present disclosure relates generally to antenna systems for distributing OTA signals to media devices.

BACKGROUND

Antennas for television reception, otherwise known as over the air (OTA) antennas, are well known and routinely used to receive television broadcast signals. Televisions generally include a built-in tuner or an external tuner (e.g., set top box). The OTA antenna can be connected to the tuner (e.g., built-in or external). In some instances, the OTA antenna can be configured to amplify OTA signals. OTA antennas are useful in rural settings where incoming signals require amplification.

Although cable television services have displaced the need for OTA antennas, consumers are now opting to replace cable television services with more cost-effective internet-based streaming services. However, one perceived disadvantage of internet-based streaming services relates to the inability to watch local programming (e.g., local news) provided by local broadcast stations. Since OTA antennas can receive OTA signals associated with local programming, consumers of internet-based streaming services are opting to invest in OTA antennas.

SUMMARY

Aspects and advantages of embodiments of the present disclosure will be set forth in part in the following description, or may be learned from the description, or may be learned through practice of the embodiments.

One example aspect of the present disclosure is directed to an antenna system for use distributing over the air (OTA) content. The antenna system can include a network access point. The antenna system can include an OTA antenna system configured to receive an OTA signal associated with media content. The OTA signal can be a VHF signal or a UHF signal. The OTA antenna system can be coupled to the network access point via a universal serial bus (USB) connection. The access point can include one or more processors and one or more memory devices. The one or more memory devices store computer-readable instructions that when executed by the one or more processors cause the one or more processors to perform operations. The operations can include receiving a signal associated with the media content from the OTA antenna system via the universal serial bus connection. The operations can include communicating media content via a network communication link to one or more client devices. The OTA antenna system can include a modal antenna configurable in a plurality of antenna modes. Each antenna mode can be associated with a distinct radiation pattern or polarization.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which:

FIG. 6 depicts an example database of channel quality indicators according to example embodiments of the present disclosure;

DETAILED DESCRIPTION

Figure 1:
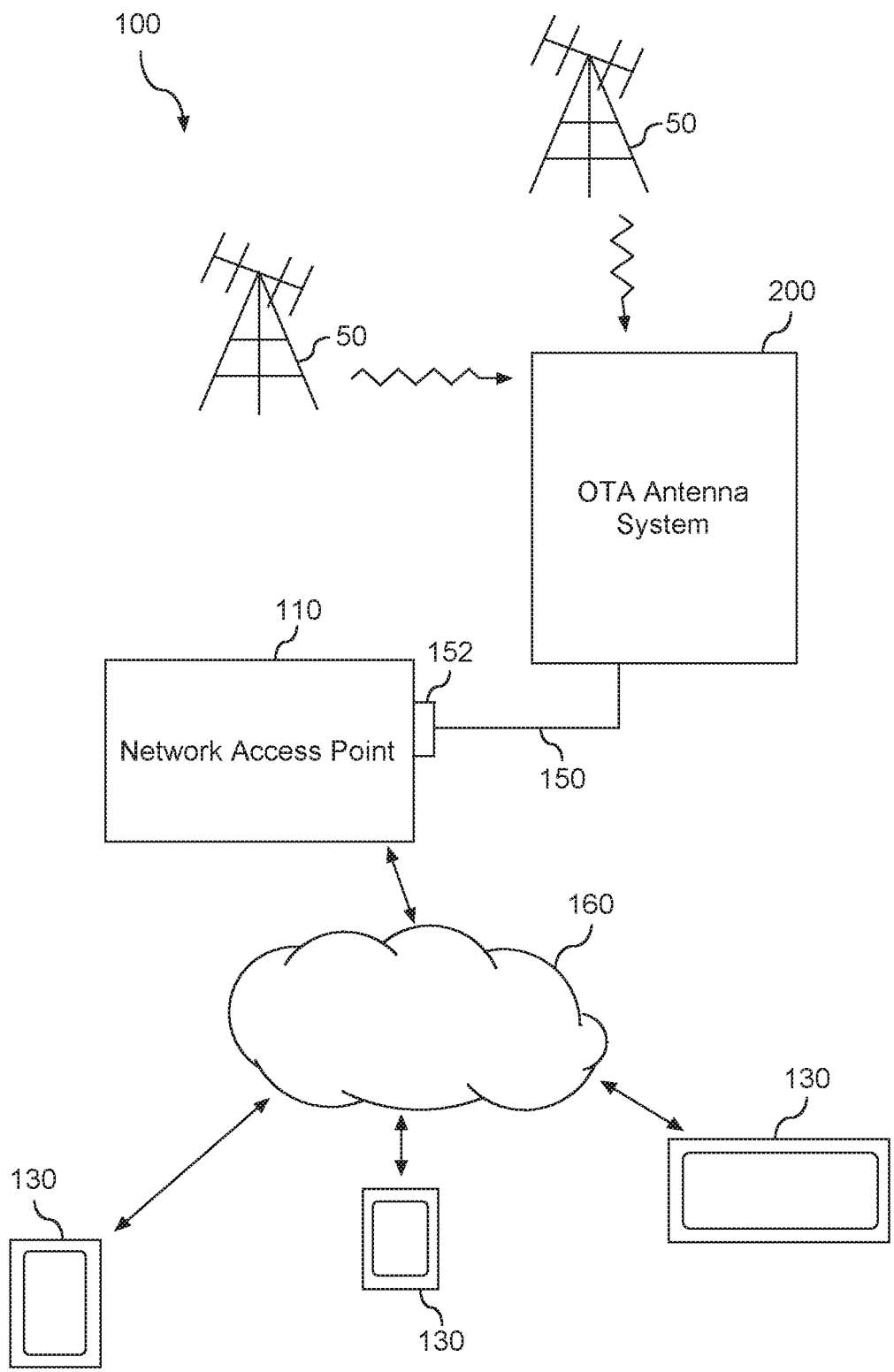
FIG. 1 depicts an example system according to example embodiments of the present disclosure.

Reference now will be made in detail to embodiments, one or more examples of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

Example aspects of the present disclosure are directed to antenna systems for distributing OTA content (e.g., OTA media) to one or more client devices in a network, such as a wireless local area network (WLAN). According to example aspects of the present disclosure, an OTA antenna system can be configured to receive media content (e.g., local broadcast television media) over RF frequency bands in the VHF (30 MHz to 300 MHz) and/or UHF frequency bands (e.g., about 450 MHz to 900 MHz). The OTA antenna system can be tuned to receive channels in the VHF and UHF band. Media content (e.g., television media) received over the channels can be demodulated and re-transmitted among client devices in a local area network (e.g., home devices connected to an 802.11 WiFi network).

More particularly, the OTA antenna system can be coupled to a network access point (e.g., a router) via a universal serial bus (USB) connection or other removable connection. Media content received over one or more channels in the VHF and/or UHF frequency bands can be received, demodulated, and provided to the network access point via the universal serial bus connection. The network access point can communicate the media content to one or more client devices (e.g., smartphones, tablets, laptops, televisions, IoT devices, etc.) connected to the network access point via a communication link (e.g., 802.11 wireless network communication link).

In some embodiments, the OTA antenna system can include a modal antenna(s). The modal antenna(s) can be configured in a plurality of different antenna modes to provide for beam steering of the radiation pattern for the modal antenna. Each antenna mode can be associated with a different radiation pattern and/or polarization. The modal antenna(s) in the OTA antenna system can be configured in the antenna mode that provides a radiation pattern for the increased (e.g., optimum) communication link quality for receiving media content over one or more channels (e.g., optimized for multiple channels, optimized for a single channel, etc.).

The network access point can include one or more processors and one or more memory devices. The one or more memory devices can include computer-readable instructions that when executed by the one or more processors cause the one or more processors to perform operations. In some embodiments, the operations can include determining a selected mode for the modal antenna(s) of the OTA antenna system. The selected mode can be determined based at least in part on a channel quality indicator (CQI) for the communicating over the channel in a particular antenna mode of the plurality of antenna modes. The CQI can be a metric such as, for instance, a channel quality indicator (CQI), such as, for example, receive power (RP), signal to noise ratio (SNR), signal-to-interference-plus-noise ratio (SINR), magnitude error ratio (MER), error vector magnitude (EVM), bit error rate (BER), block error rate (BLER), or packet error rate (PER), or other metrics known in the art.

For instance, in some embodiments, the one or more memory devices can store data indicative of one or more CQI(s) for each channel for each antenna mode of the modal antenna. The CQI(s) can be correlated to a quality score for receiving media content over the channel when the modal antenna is configured in the selected mode. The instructions can specify determining a selected mode to provide the best and/or improved quality score for communication with a selected channel or for multiple channels. Once the selected mode is determined for communicating over a channel, the network access point can be configured to communicate control signals to configure the modal antenna in the selected mode via the USB connection. In this way, computer-readable instructions (e.g., software) operable to configure the modal antenna of the OTA antenna system coupled to the network access point via the USB connection can be resident at the network access point.

For instance, in some embodiments, a user can connect an OTA antenna system to a network access point via a USB connection (e.g., USB 1.0, USB 1.1, USB 2.0, USB 3.0, USB 3.1, USB 3.2, USB Type A, USB Type C) or other removable connection (e.g., HDMI, Thunderbolt, DisplayPort, Ethernet port, etc.). Software associated with configuring and driving the modal antenna(s) of the OTA antenna system can be obtained via the USB connection and stored in one or more memory devices of the network access point. During operation, the network access point can configure the modal antenna(s) and otherwise control the OTA antenna system to receive OTA media content from one or more channels in the VHF and/or UHF bands. The network access point can communicate the media content to one or more client devices over a network communication link (e.g. Ethernet, 802.11, etc.).

The systems and methods according to example aspects of the present disclosure can have a number of technical effects and benefits. For instance, a network access point (e.g., wireless router) can be configured as a distribution platform for OTA media content to a plurality of client devices in a home or building simply be connecting an OTA antenna system to the network access point via a USB connection or other suitable connection. The OTA antenna system can include one or more modal antennas that can be configured by the network access point for beam steering to point radiation patterns in directions to provide increased communication link quality for receiving OTA media content, leading to reduced errors and improved quality of media content distribution in the home or business.

A "modal antenna" refers to an antenna capable of being operated in a plurality of antenna modes. Each antenna mode is associated with a distinct radiation pattern and/or characteristic. A "channel quality indicator" (CQIs) provides a metric indicative of communication link quality over a channel. Example CQIs include receive power (RP), signal to noise ratio (SNR), signal-to-interference-plus-noise ratio (SINR), magnitude error ratio (MER), error vector magnitude (EVM), bit error rate (BER), block error rate (BLER), or packet error rate (PER). A "channel" refers to a specific frequency channel in the VHF band and/or UHF band over which television media content can be broadcast. The use of the term "about" in conjunction with a numerical value refers to within 20% of the stated numerical value.

FIG. 1 depicts an example system 100 for distribution of OTA media content according to example embodiments of the present disclosure. The system 100 includes an OTA antenna system 200 operable to receive television media content broadcast over different channels in the VHF and/or UHF bands from, for instance, broadcast towers 50. The OTA antenna system 200 can be coupled to a network access point 110 (e.g., WLAN router).

The OTA antenna system 200 can be coupled to the network access point 110 via a USB connection 150 at a USB port 152. The USB connection 150 can be, for instance, USB 1.0, USB 1.1, USB 2.0, USB 3.0, USB 3.1, USB 3.2, USB Type A, USB Type C, or other USB connection. Aspects of the present disclosure are discussed with reference to a USB connection. Those of ordinary skill in the art, using the disclosures provided herein, will understand that other removable connections can be used without deviating from the scope of the present disclosure.

The OTA antenna system 200 can receive an OTA signal associated with media content broadcast over one or more channels. The OTA antenna system 200 can demodulate the signals and provide a signal associated with the media content to the network access point 110. The network access point 110 can receive the signal associated with the media content from the OTA antenna system 200 over USB connection 150. The network access point 110 can then act as a server and serve the media content to one or more client devices 130 over a network 160.

The network 160 can include any combination of wired and/or wireless communication links. For instance, the network 160 can be an 802.11 (WiFi) network that provides a wireless local area network in a home, building, or other space. The network 160 can further include wired communication links, such as Ethernet or other wired communication links. Communication over network 160 can be accomplished using any suitable protocol and/or protection scheme without deviating from the scope of the present disclosure.

The client devices 130 can be, for instance, smartphones, tablets, wearable devices, laptops, desktops, televisions, displays with one or more processors, IoT devices, or other suitable electronic device capable of communicating with network access point 110 over network 160. The client devices 130 can include one or more processors and one or more memory devices. The one or more memory devices can store computer-readable instructions (e.g., software) that when executed by the one or more memory devices cause the one or more processors to perform operations. The operations can include, for instance, obtaining media content communication from network access point 110 over network 160 and providing for display on a display device the media content for viewing by a user.

Figure 2:
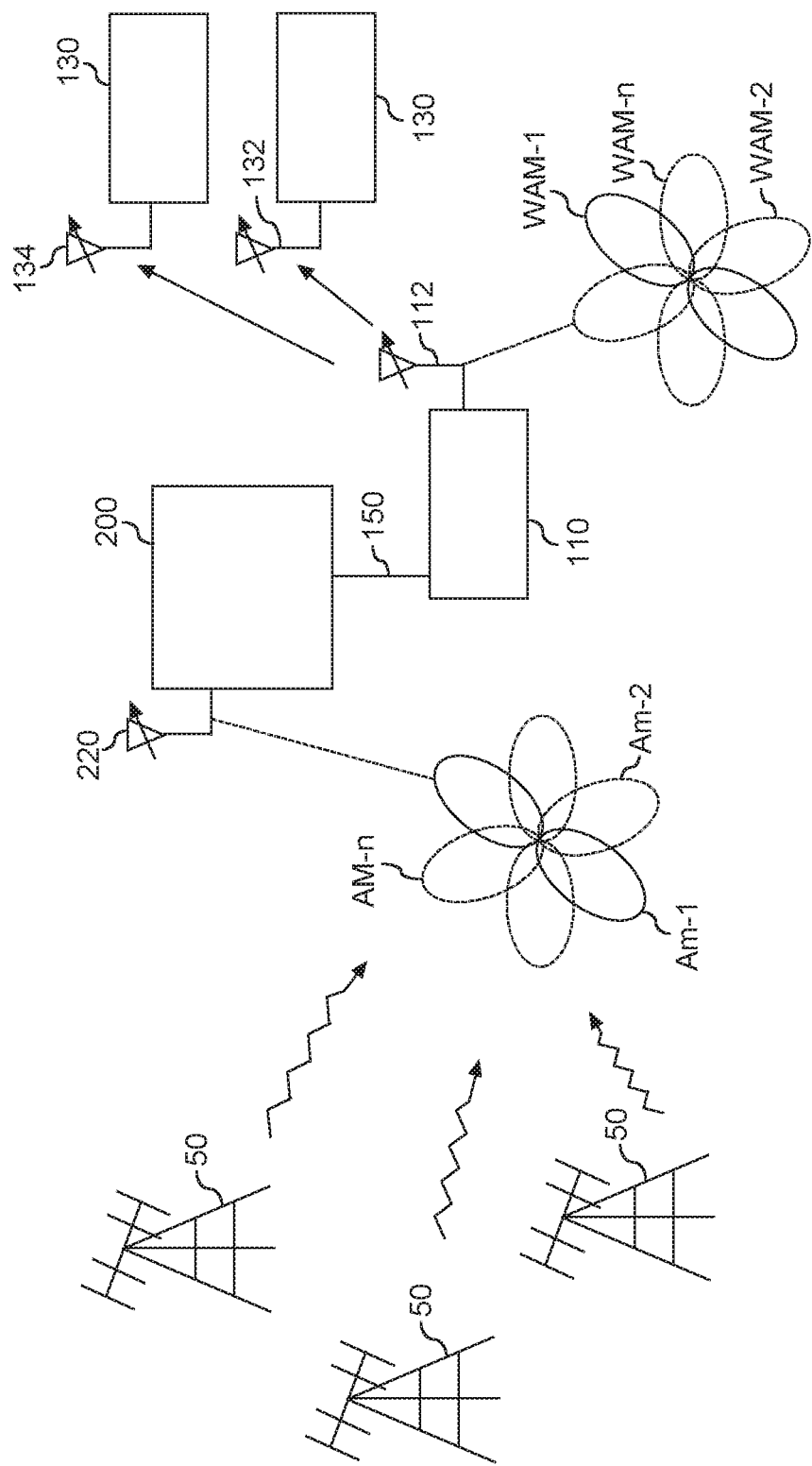
FIG. 2 depicts an example system according to example embodiments of the present disclosure.

FIG. 2 depicts reception of OTA signals by the OTA antenna system and communication of signals by a network access point according to example aspects of the present disclosure. As shown, the OTA antenna system 200 can include a modal antenna 220. Example configurations of modal antennas for use in OTA antenna system will be discussed in detail below. The modal antenna 220 can be configured to provide for beam steering functionality to improve link quality for receiving OTA signals, such as signal 52a (e.g., Channel X) from broadcast tower 50a, signal 52b (e.g., Channel Y) from broadcast tower 50b, and signal 52c (e.g., Channel Z) from broadcast tower 50c.

More particularly, the modal antenna 220 for the OTA antenna system 200 can be configurable in a plurality of antenna modes AM-1, AM-2, AM-n. Each antenna mode can be associated with a different radiation pattern and/or polarization. The modal antenna 220 can be controlled to operate in a specific antenna mode depending on the channel for desired OTA signal reception. For instance, as one example, the modal antenna 220 can be configured in mode AM-1 for receiving signal 52a (e.g., Channel X) from broadcast tower 50a. The modal antenna 220 can be configured in mode AM-1 for receiving signal 52b (e.g., Channel Y) from broadcast tower 50b. The modal antenna 220 can be configured in mode AM-n for receiving signal 52c (e.g., Channel Z) from broadcast tower 50c. As will be described in detail below, the network access point 110 can include computer-readable instructions (e.g., software) configured to provide control signals over USB connection 150 to OTA antenna system 200 for configuring the modal antenna 220 in a selected mode for each channel.

In some embodiments, as shown in FIG. 2, the network access point 110 can also include a modal antenna 112. The modal antenna 112 can similarly be configurable in a plurality of antenna modes to provide beam steering capability to improve communication link quality with the one or more client devices 130. The modal antenna 112 can be configurable in a plurality of antenna modes WAM-1, WAM-2, WAM-n. Each antenna mode can be associated with a different radiation pattern and/or polarization. The modal antenna 112 can be controlled to operate in a specific antenna mode depending on the client device 120 with which the network access point 110 is communicating. For instance, as one example, the modal antenna 112 can be configured in mode WAM-1 for communicating with a first client device and in mode WAM-2 for communication with a second client device. As will be described in detail below, the network access point 110 can include computer-readable instructions (e.g., software) configured to control modal antenna 112 to operate in a selected mode to increase communication link quality the one or more client devices 130.

As shown in FIG. 2, one or more of the client devices 130 may also include a modal antenna 132 operable in a plurality of different modes. Each mode can be associated with a different radiation pattern and/or polarization. The client device 130 can be configured to control the modal antenna 132 to increase communication link quality with the network access point 110. The client device 130 can also include a passive antenna 134. Passive antennas 134 can, for instance, provide static radiation patterns that are not capable of beam steering or beam forming.

Figure 3:
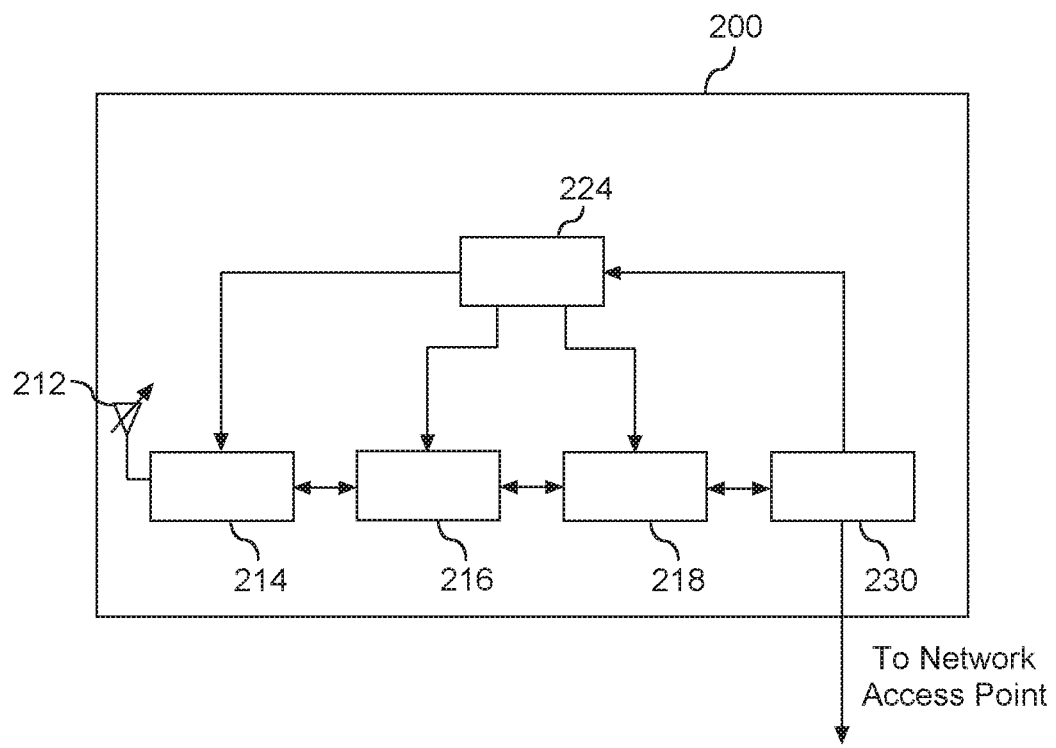
FIG. 3 depicts an example OTA antenna system according to example embodiments of the present disclosure.
Figure 4:
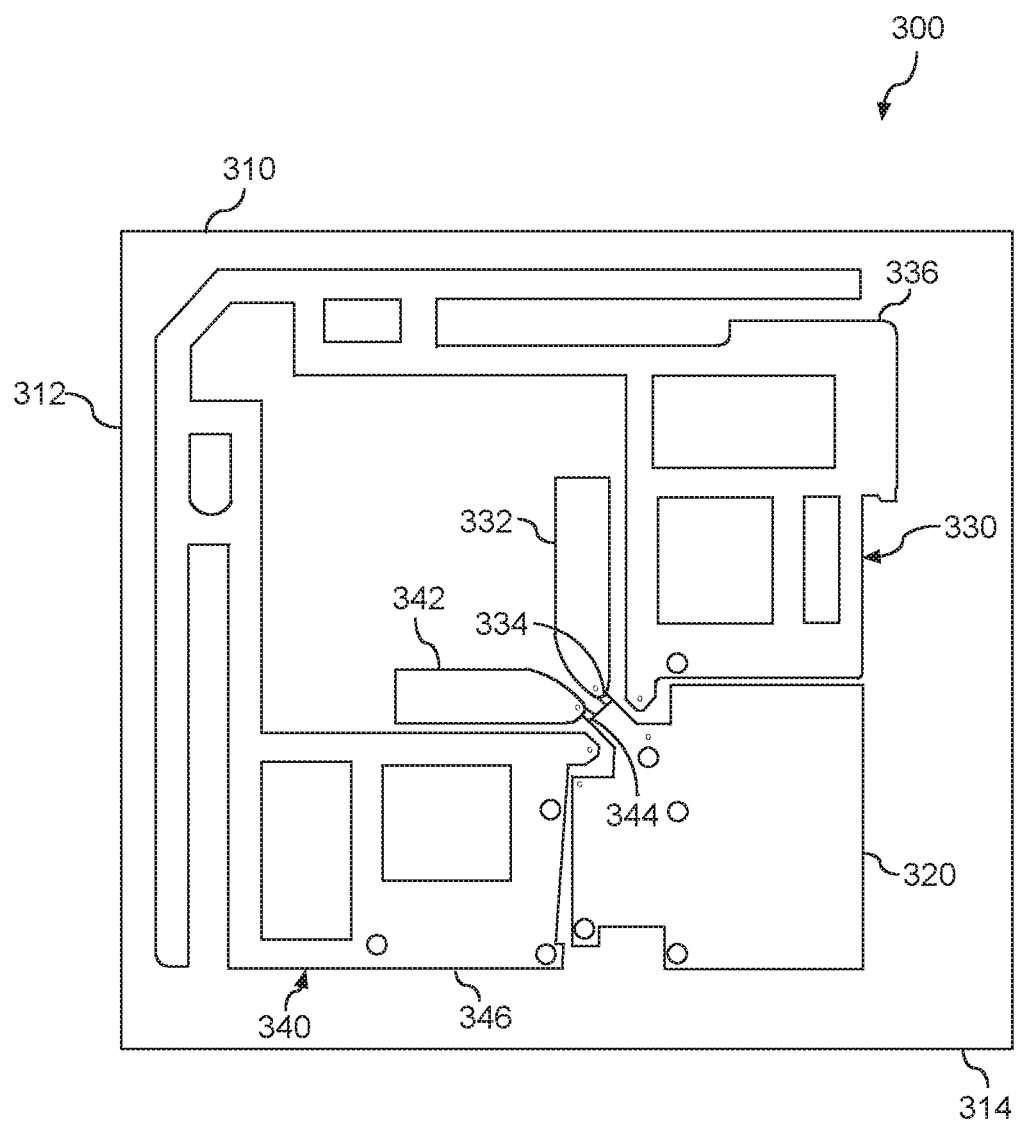
FIG. 4 depicts an example modal OTA antenna used in an OTA antenna system according to example embodiments of the present disclosure.

FIG. 3 depicts a schematic of an example OTA antenna system 200 according to example embodiments of the present disclosure. As discussed, the OTA antenna system 200 includes a modal antenna 212 capable of operation in a plurality of antenna modes to implement beam steering functionality. An example modal antenna 212 capable of receiving OTA signals in the VHF and/or UHF band is illustrated in FIG. 4.

As shown in FIG. 3, the modal antenna 212 is coupled to RF circuitry 214 (e.g., front end). The RF circuitry 214 can include one or more circuits configured for impedance matching, mode selection of the modal antenna 212, low noise amplifiers, etc. As discussed in more detail below, modal antennas can include one or more parasitic elements. In some implementations, the parasitic element and/or a radiating element of the modal antenna can be coupled to one or more components, such as switches, inductors, capacitors, tunable inductors, tunable capacitors, or solid state devices to adjust the antenna mode of the modal antenna. These components can be included within the RF circuitry 214, but may be located elsewhere in the OTA antenna system 200.

In some implementations, a VHF and/or UHF signal (e.g., OTA signal) received by the modal antenna can be provided to a tuner 216. The tuner 216 can select (e.g., filter) a particular channel (e.g., frequency band) received by the modal antenna. In some embodiments, the tuner 216 can be controlled by a controller 224 based on one or more commands from a network access point (e.g., received via the USB connection) to select a particular channel providing OTA media content to the network access point.

As one particular example, a user can access an application implemented on a client device that allows for viewing OTA media content and can interact with the application to request a particular OTA channel for viewing. The client device can send this request to the network access point over a network (e.g., 802.11 WiFi network). The network access point can send commands via the USB connection to the OTA system to control the tuner 216 to tune the OTA system 200 to receive and demodulate signals associated with the request channel(s). In some embodiments, a user can control the antenna through voice commands received from a device associated with a digital assistant service.

The OTA system can include a demodulator 218. The demodulator 218 can demodulate the signals received from the tuner to extract the media content. Signals associated with the media content can then be provided to communication interface 230. The communication interface 230 can be configured to communicate the signals associated with the media content to the network access point, for instance, over the USB connection. The communication interface 230 can include circuitry for packaging content extracted from the demodulator 218 into an appropriate format for communicating via the USB connection.

The communication interface 230 can also be configured to receive commands from the network access point via the USB connection. The commands can include, for instance, a request to tune the OTA system to a particular channel. The commands can include, for instance, a command to configured the modal antenna 212 in a particular antenna mode (e.g., to increase communication link quality). The commands can be provided to controller 224. The controller 224 can then control aspects of the OTA antenna system 200 (e.g., RF circuitry 214, tuner 216, demodulator 218) to implement the commands.

FIG. 4 depicts an example modal antenna 300 that can be used in an OTA antenna system 200 according to example embodiments of the present disclosure. As shown, the modal antenna 300 includes a substrate 310 and a ground plane 320 formed on the substrate 310. In some implementations, the modal antenna 300 includes a first radiating element 330. The modal antenna can include a first parasitic element 332 positioned adjacent to the first radiating element 330. An active element (e.g., switch, tunable inductor, tunable capacitor, capacitor, and/or combination thereof) 334 can be coupled between the first parasitic element 332 and the ground plane 320. The active element 334 can include a multi-port switch configured to open-circuit, short-circuit, or reactively load the first parasitic element 332 to adjust a radiation pattern of the radiating element 330. In this way, the active element 334 can be controlled to adjust an antenna mode of the modal antenna 300.

In some implementations, the antenna 300 can include a second radiating element 340. The modal antenna 300 can include a second parasitic element 342 positioned adjacent to the second antenna 340. An active element (e.g., switch, tunable inductor, tunable capacitor, capacitor, and/or combination thereof) 344 can be coupled between the first parasitic element 342 and the ground plane 320. The active element 344 can include a multi-port switch configured to open-circuit, short-circuit, or reactively load the first parasitic element 342 to adjust a radiation pattern of the radiating element 330. In this way, the active element 344 can be controlled to adjust an antenna mode of the modal antenna 300.

Figure 5:
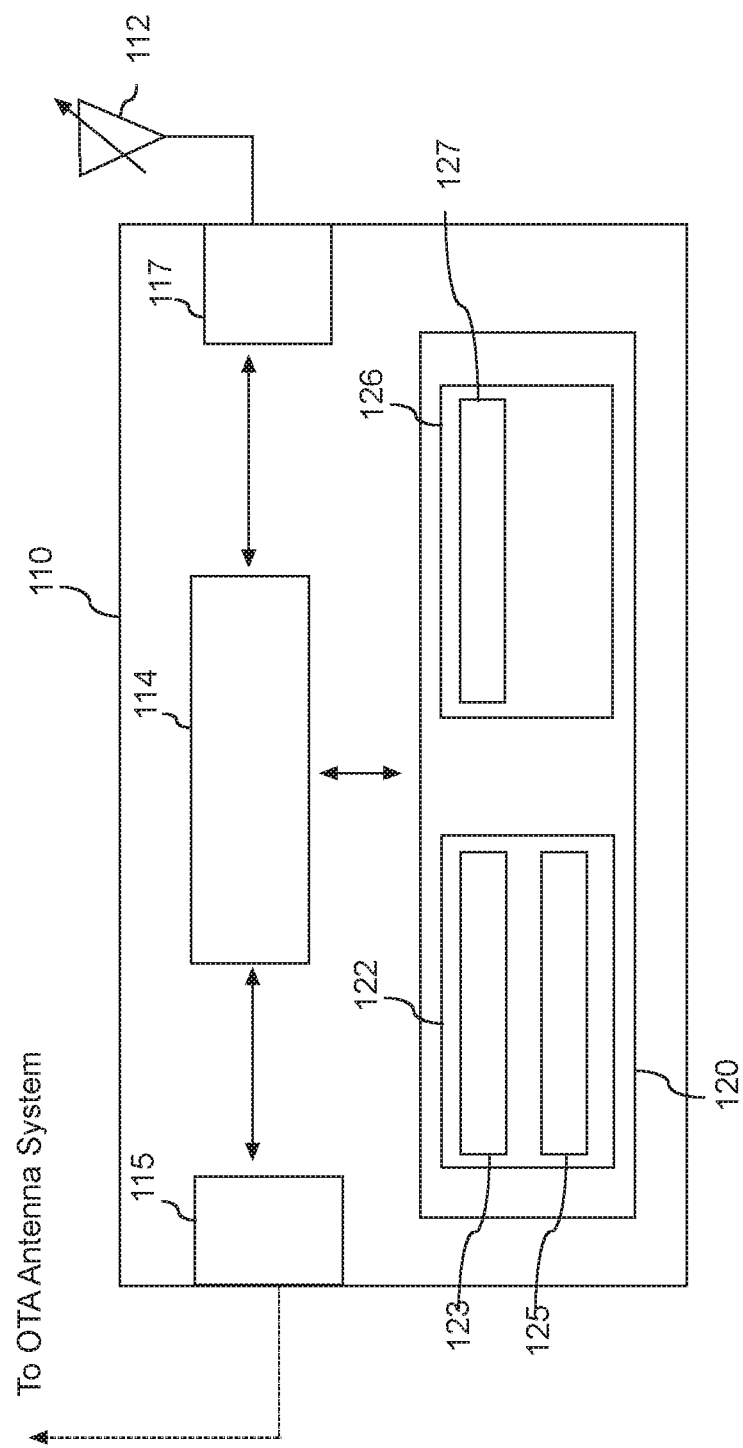
FIG. 5 depicts an example network access point according to example embodiments of the present disclosure.

FIG. 5 depicts a schematic of an example network access point 110 according to example embodiments of the present disclosure. As discussed, the network access point 110 can include a modal antenna 112 operable in a plurality of different modes to wirelessly communicate information to one or more client devices. The network access point 110 can include one or more processors 114 and one or more memory devices 120. The one or more memory devices can store computer-readable instructions 122 and data 126.

The network access point 110 can include a communications interface 115 configured to provide for communication with an OTA antenna system. The communications interface 115 can be, for instance, a USB interface. The USB interface can include appropriate mechanical ports for receiving a USB connection as well as appropriate interface circuitry for communicating over the USB connection. Example information communicate via the USB connection and communications interface 115 can include, for instance, signals associated with media content obtained from the OTA antenna system, software obtained from the OTA antenna system, control signals for configuring the OTA antenna system, etc.

The network access point 110 can include communications interface 117. Communications interface 117 can include, for instance, one or more transceivers, receivers, transmitters, front end modules, baseband processors, RF circuitry, antenna control modules, etc. for controlling communications via modal antenna 112 and/or other communication links (e.g., passive antennas, hardwired links (Ethernet), etc. In some embodiments, the communications interface 117 can include an antenna control module or antenna tuning module operable to configure the modal antenna 112 in one of a plurality of different modes. Example modal antenna(s) 112 will be discussed in more detail below.

The computer-readable instructions 122 can include different software engines configured to provide desired functionality for the network access point. For instance, the computer-readable instructions 122 can include a first set of instructions 123 associated with providing wireless routing and network access point functionality (e.g., receiving and transmitting of information over a network). The computer-readable instructions 122 can include a second set of instructions 124 associated with the OTA antenna system. For instance, the second set of instructions 124 can include antenna drivers for operating the antenna(s) of the OTA antenna system. The second set of instructions 124 can include instructions associated with configuring the modal antenna(s) of the OTA antenna system in a selected mode of a plurality of antenna modes.

The data 126 can include, for instance, a database of information associated with operation of each of the modal antenna in each of the antenna modes. For instance, the data 126 can include a database 127 (e.g., lookup table, matrix, correlation) identifying one or more CQI(s) and/or quality scores computed based on CQI(s) associated with reception of OTA signals for each channel for each mode of the modal antenna(s). The processor(s) 114 can determine a selected mode for operating the modal antenna(s) of the OTA system based at least in part on the information in the database 127.

As used herein, the term "processor" refers not only to integrated circuits referred to in the art as being included in a computer, but also refers to a controller, microcontroller, a microcomputer, a programmable logic controller (PLC), an application specific integrated circuit (ASIC), a Field Programmable Gate Array (FPGA), and other programmable circuits. Memory device(s) can include memory element(s) including, but not limited to, computer readable medium (e.g., random access memory (RAM)), computer readable non-volatile medium (e.g., flash memory), and/or other suitable memory elements or combinations thereof.

Referring now to FIG. 6, in some embodiments, the instructions 124 executed by the processor(s) 114 of the network access point 110 can be configured to populate a look-up table or database 400 with information or "data" indicative of performance of the modal antenna of the OTA antenna system while operating in each of the plurality of modes. As will be discussed below in more detail, the instructions 124 can be executed by the processors 114 of the network access point 110 determine a selected mode of operation for the modal antenna of the OTA antenna system based at least in part on the data included in the database 400.

In some implementations, the database 400 can include a detection status 410 for channel numbers 1 through M. It should be appreciated that M is variable indicative of the total number of channels detected by the modal antenna. For example, if the modal antenna can detect a total of six different channels across the different modes of operation, the variable M would be assigned the numerical value "6" in the database 400. As shown in FIG. 6, the modal antenna cannot detect (e.g., receive a strong enough signal from) channel 1. Accordingly, the detection status 410 for channel 1 is No. In contrast, the modal antenna can detect channels 2, 3, and M. Accordingly, the detection status for channels 2, 3, and M is Yes.

In some implementations, the system can determine a CQI for a given channel (e.g., channels 1 through M) and a given antenna mode (e.g., modes 1 through N) of the plurality of antenna modes in which the modal antenna can operate. It should be appreciated that N is a variable indicative of the total number of antenna modes. For example, if the modal antenna can operate in four different modes, the variable N would be assigned the numerical value "4". It should be appreciated that the system can determine the CQI based, at least in part, on the metric(s) obtained via signals from OTA antenna system.

As shown in FIG. 6, the system can determine the CQI for channel 2 is equal to 28 when the modal antenna is operating in Mode 1. In contrast, the system can determine the CQI for channel 2 is equal to 29 when the modal antenna 602 is operating in Mode 2.

In some implementations, a weighting factor 420 can be applied to channels 1 through M. For example, the weighting factor 420 can be determined based on the detection status 410 of a given channel. For instance, channels that cannot be detected, such as channel 1, can be assigned a weighting factor of zero. In this manner, channels whose detection status 410 is "No" cannot impact a quality score $S_n$ that is determined for each mode (e.g., Modes 1 through N). As another example, the weighting factor 420 can vary depending on a magnitude of the CQI for a given channel. For instance, the CQI for channel 2 is greater than channel 3. As such, the weighting factor 420 assigned to channel 2 can be less than the weighting factor 420 assigned to channel 3. More specifically, the channel 2 can be assigned a weighting factor 420 of a quarter of a point (e.g., 0.25), whereas channel 3 can be assigned a weighting factor 4 of one (e.g., 1). In this manner, channel 3 can be weighted more heavily than channel 3 when the quality score $S_n$ is calculated for each of the modes (e.g., Modes 1 through N).

In some implementations, the quality score $S_n$ for each of the modes (e.g., Modes 1 through N) can be determined as shown in Equation 1:

$$S_n = \Sigma_{m=1}^{M}(w_m \times CQI_{m,n}) \quad \text{Equation 1}$$

In the above formula, $w_m$ corresponds to the weighting factor assigned to channels 1 through M. Additionally, $CQI_{m,n}$ corresponds to the channel quality indicator for a given channel m and mode n. Accordingly, the quality score $S_n$ for the first mode can be calculated as shown below in Equation 2:

$$S_n = (w_1 * CQI_{1,1}) + (w_2 * CQI_{2,1}) + (w_3 * CQI_{3,1}) + \ldots + (w_M * CQI_{1,N}) \quad \text{Equation 2}$$

In some implementations, the selected mode of operation for the modal antenna can correspond to the mode having the highest quality score $S_n$. More specifically, the selected mode $n_{selected}$ can be determined as shown below in Equation 3:

$$n_{selected} = \arg\max_n(S_n) \quad \text{Equation 3}$$

FIG. 6 depicts one example type of CQI database that can be used for configuring a modal antenna of an OTA antenna system according to example embodiments of the present disclosure. Those of ordinary skill in the art, using the disclosures provided herein, will understand that other types of data, CQIs, and quality scores can be used without deviating from the scope of the present disclosure.

Figure 7:
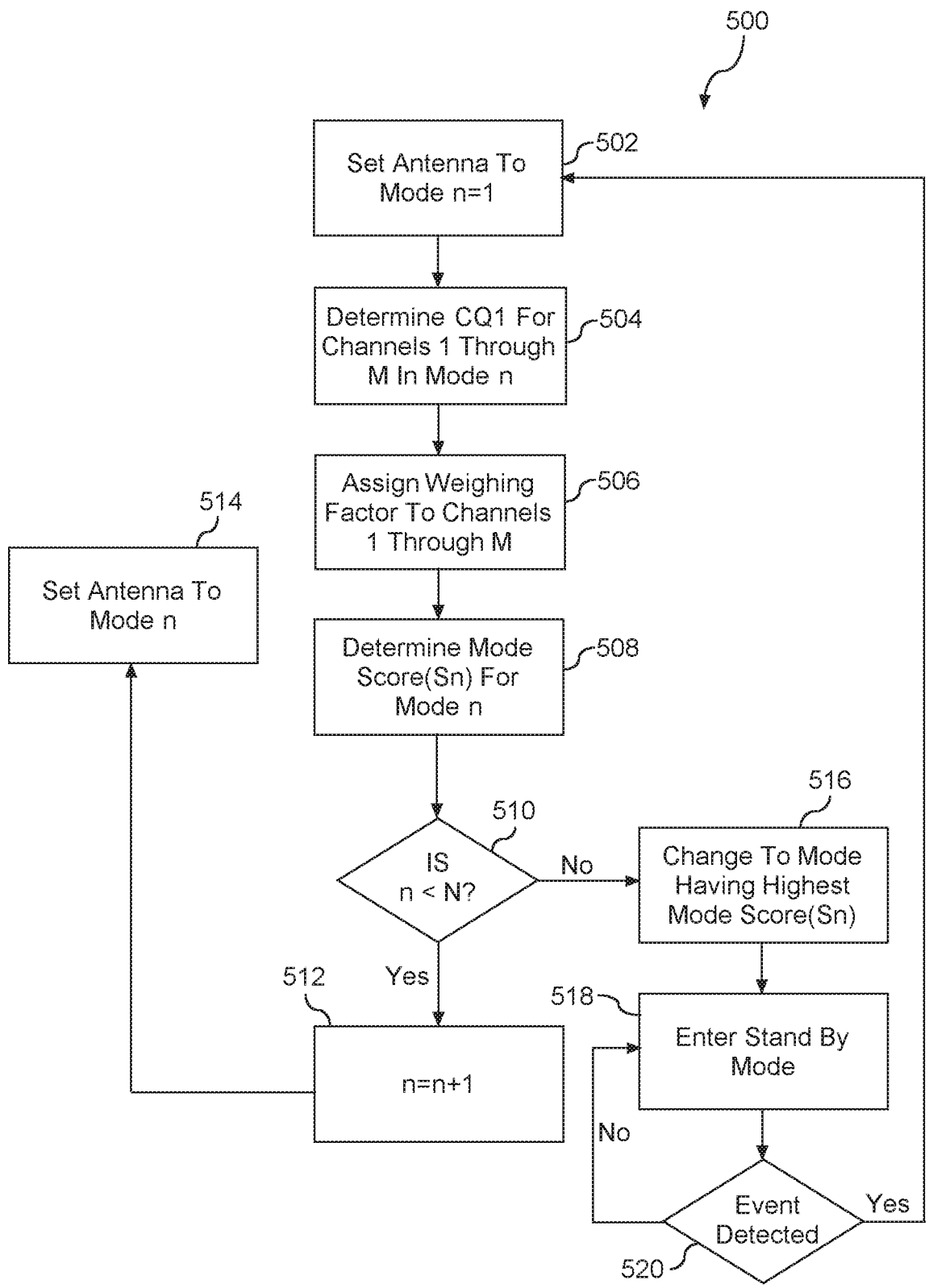
FIG. 7 depicts an example method according to example embodiments of the present disclosure.

FIG. 7 depicts a flow diagram of a method (600) for determining the selected mode of operation for a modal antenna of antenna system is provided according to example embodiments of the present disclosure. The method (600) may be implemented using, for instance, the antenna system discussed above with reference to FIG. 1 (e.g., by the network access point). FIG. 7 depicts steps performed in a particular order for purposes of illustration and discussion. Those of ordinary skill in the art, using the disclosures provided herein, will understand that various steps of the method (600) may be adapted, modified, rearranged, performed simultaneously or modified in various ways without deviating from the scope of the present disclosure.

At (602), the method (600) includes configuring the modal antenna in one of N modes of operation. Additionally, a mode counter variable n can be assigned a value of 1. At (604), the method (600) includes determining a CQI for each channel (e.g., channels 1 through M) that is detected while the modal antenna is operating in mode n. At (606), the method (600) includes assigning a weighing factor to each channel. As discussed above, the weighting factor can be assigned based on a variety of factors. For instance, the weighting factor for a channel that is not detected by the modal antenna can be assigned a weighting factor of zero. Alternatively and/or additionally, channels that are detected by the modal antenna can be assigned a weighting factor based, at least in part, on the CQI value determined at (604). For instance, a weighting factor assigned to a channel having a CQI that is greater than a minimum value by a predetermined amount can be different than a weighting factor assigned to a channel having a CQI that is not greater than the minimum value by minimum amount. In some embodiments, the minimum value can correspond to a minimum CQI that is required to decode the signals and view content being broadcast on the channel.

At (608), the method (600) includes determining a quality score for the current mode in which the modal antenna is operating. At (610), the method (600) includes determining whether the mode variable counter is less than a total number of modes N in which the modal antenna can operate. If n is less than N, the method proceeds to (612). However, if n is greater than or equal to N, the method proceeds to (616).

At (612), the method (600) includes incrementing a mode variable counter n. For instance, if the current mode of the modal antenna corresponds to the first mode, the mode variable counter can be assigned a value of 1. Accordingly, at (610), the mode variable counter can be incremented according to Equation 4 shown below:

$$n = n+1 \quad \text{Equation 4}$$

At (614), the method (600) includes reconfiguring the modal antenna based, at least in part, on the mode counter variable. As an example, if the mode counter variable is equal to 2, the modal antenna can be configured to a second mode of the N different modes. In this manner, the current mode of the modal antenna can be changed from the first mode to the second mode. Once the current mode of the modal antenna has been reconfigured, the method reverts to (604).

At (616), the method (600) includes configuring the modal antenna to operate in the selected operating mode. In some implementations, the selected operating mode can correspond to the mode (e.g., 1 through N) with the highest quality score determined at (608). Once the modal antenna is configured in the selected operating mode, the method proceeds to (618).

At (618), the method (600) includes entering a standby mode until the occurrence of a detected event. In some implementations, the detected event can occur when a predetermined amount time lapses since the modal antenna was configured in the selected operating mode at (616). Alternatively or additionally, the detected event can occur when metrics obtained indicate an amount of interference associated with the signals exceeds a threshold value. In some implementations, the detected event can occur based on a detected change in position of the antenna. In some implementations, the detected event can occur when an OTA antenna system is connected to a network access point via a USB connection. The detected event can be a user request to view a particular channel. It should be appreciated that the method (600) reverts to (602) in response to the occurrence of a detected event.

In some implementations, the detected event can occur when user-input is received via an input device. More specifically, the input device can include one or more mechanical interface elements (e.g., push-button) in operative communication with the controller. Alternatively or additionally, the input device can include a mobile device (e.g., smartphone, tablet, laptop, etc.) that is communicatively coupled to the controller via any suitable wired or wireless communication link.

FIG. 7 depicts one example method for configuring a modal antenna of an OTA antenna system using a network access point according to example embodiments of the present disclosure. Those of ordinary skill in the art, using the disclosures provided herein, will understand that other suitable methods, processes, and/or algorithms can be used to enhance communication link quality with one or more channels can be used without deviating from the scope of the present disclosure. For example, an antenna mode can be selected to optimize a CQI and/or quality score for receiving OTA media content from a single channel. As another example, an antenna mode can be selected for receiving OTA medial content from the most channels and/or with the best communication link quality.

Figure 8:
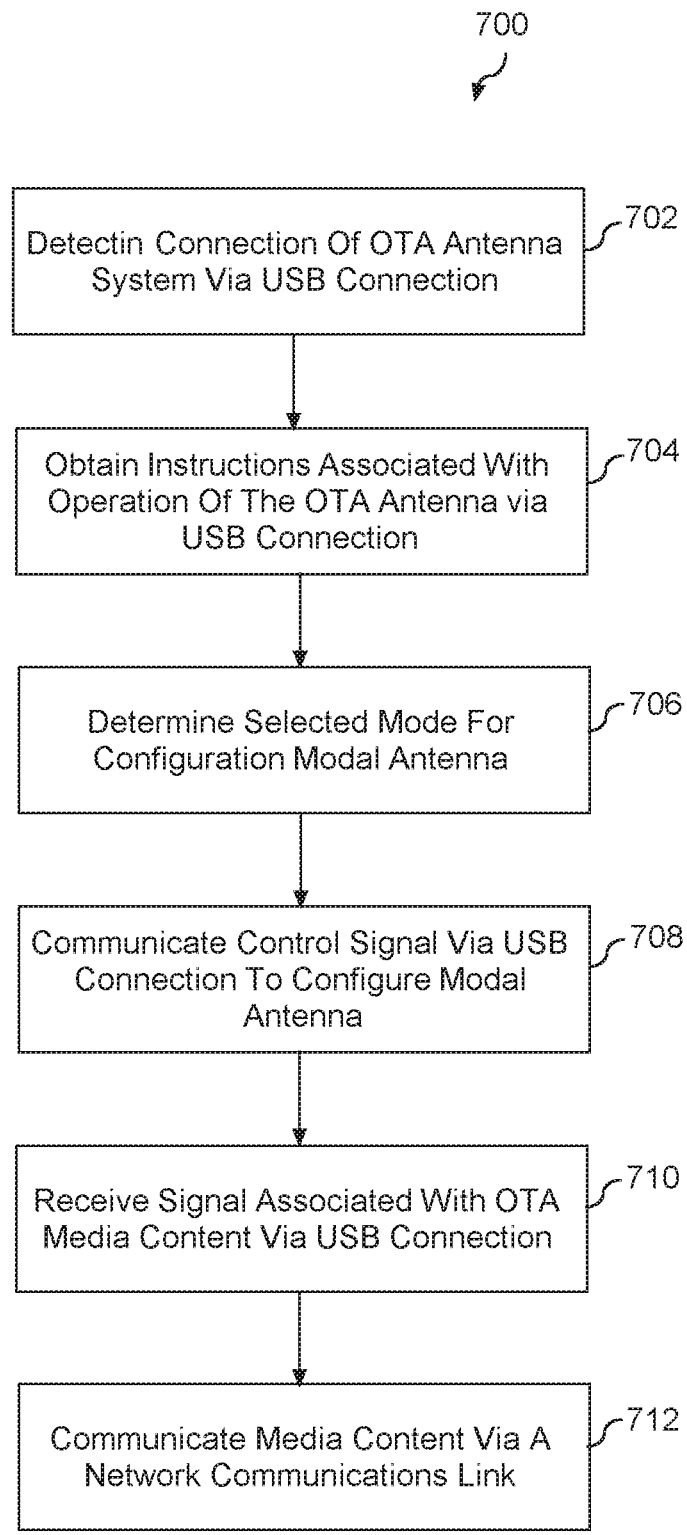
FIG. 8 depicts an example method according to example embodiments of the present disclosure.

FIG. 8 depicts a flow diagram of an example method (700) according to example embodiments of the present disclosure. The method (700) can be implemented, for instance, by the network access point of FIGS. 1, 2, and 5. FIG. 8 depicts steps performed in a particular order for purposes of illustration and discussion. Those of ordinary skill in the art, using the disclosures provided herein, will understand that various steps of the method (700) may be adapted, modified, rearranged, performed simultaneously or modified in various ways without deviating from the scope of the present disclosure.

At (702), the method can include detecting connection of OTA antenna system to the network access point via, for instance a USB connection or other removable connection. For instance, the network access point can determine that the OTA antenna system has been physically connected to a USB port of the network access point.

At (704), the method can obtain (e.g., download) instruction (e.g., software) associated with operation of the OTA antenna system via the USB connection. For instance, instructions for configuring and/or controlling the OTA antenna system via the network access point can be downloaded and stored in a memory at the network access point.

At (706), the method can include determining a selected mode for configuring a modal antenna of the OTA antenna system. The selected mode can be determined to increase communication link quality for receiving OTA content from a single channel and/or multiple channels.

At (708), the method can include communicating a control signal via the USB connection to configure the modal antenna in the selected mode. For instance, control signals can be communicated to a controller associated with the OTA antenna system via the USB connection. The controller can configure RF circuitry (e.g., active elements) associated with the modal antenna to configure the modal antenna in a selected mode of a plurality of antenna modes.

At (710), the method can include receiving signals associated with OTA media content from the OTA antenna system via the USB connection. For instance, demodulated OTA signals from the OTA antenna system can be communicated to the network access point via the USB connection.

At (712), the method can include communicating media content from the network access point to one or more client devices over a communication link. The communication link can be wired and/or wireless communication link. For instance, the communication link can be an 802.11 communication link.

Figure 9:
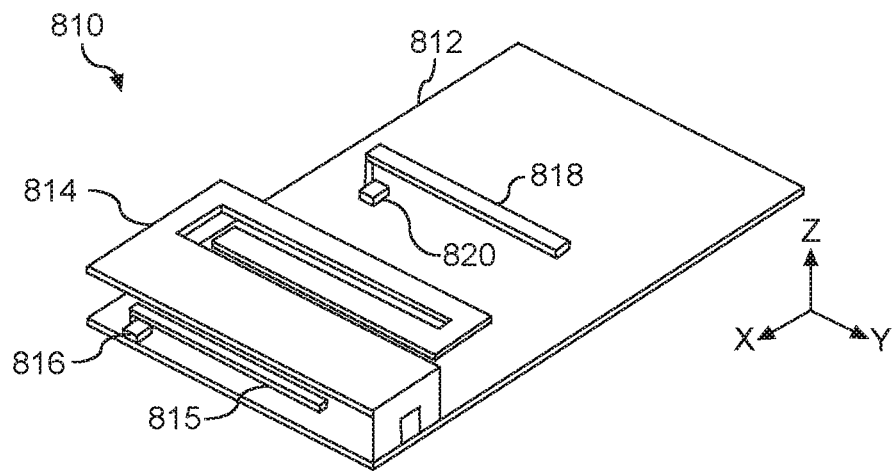
FIGS. 9, 10, and 11 depict example aspects of a modal antenna according to example embodiments of the present disclosure.

FIG. 9 illustrates an example embodiment of a modal antenna 810 that can be used, for instance with a network access point and/or one or more client devices in accordance with aspects of the present disclosure. The modal antenna 810 may include a circuit board 812 (e.g., including a ground plane) and a driven antenna element 814 disposed on the circuit board 812. An antenna volume may be defined between the circuit board (e.g., and the ground plane) and the driven antenna element.

In some embodiments, a first parasitic element 815 may be positioned at least partially within the antenna volume. A first active element 816 may be coupled with the parasitic element 815. The first active element 816 can be a passive or active component or series of components and may be configured to alter a reactance on the first parasitic element 815 either by way of a variable reactance, or shorting to ground, resulting in a frequency shift of the antenna.

In some embodiments, a second parasitic element 818 may be disposed proximate the circuit board 812 and may be positioned outside of the antenna volume. The second parasitic element 818 may further include a second active element 820 which may individually include one or more active and/or passive components. The second active element 820 can be a passive or active component or series of components and may be configured to alter a reactance on the second parasitic element 818 either by way of a variable reactance or shorting to ground, resulting in a frequency shift of the antenna. The second parasitic element 818 may be positioned adjacent the driven element 814 and may also be positioned outside of the antenna volume.

The described configuration may provide an ability to shift the radiation pattern characteristics of the driven antenna element by varying a reactance thereon. Shifting the antenna radiation pattern can be referred to as "beam steering". In instances where the antenna radiation pattern comprises a null, a similar operation can be referred to as "null steering" since the null can be shifted to an alternative position about the antenna (e.g., to reduce interference). In some embodiments, the second active element 820 may include a switch for connecting the second parasitic to ground when "On" and for terminating the short when "Off". It should however be noted that a variable reactance on either of the first or second parasitic elements, for example by using a variable capacitor or other tunable component, may further provide a variable shifting of the antenna pattern or the frequency response. For example, the first active element 716 and/or second active element 820 may include at least one of a tunable capacitor, MEMS device, tunable inductor, switch, a tunable phase shifter, a field-effect transistor, or a diode.

Figure 10:
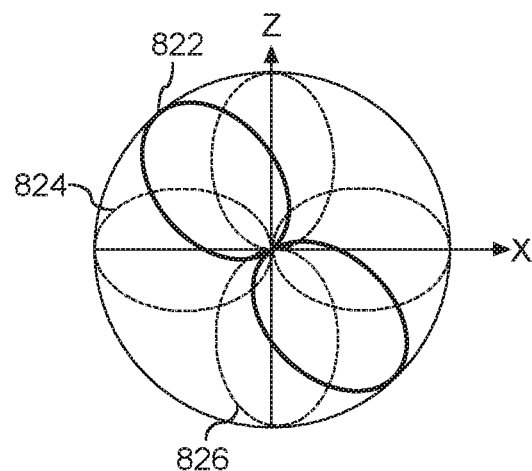
Figure 11:
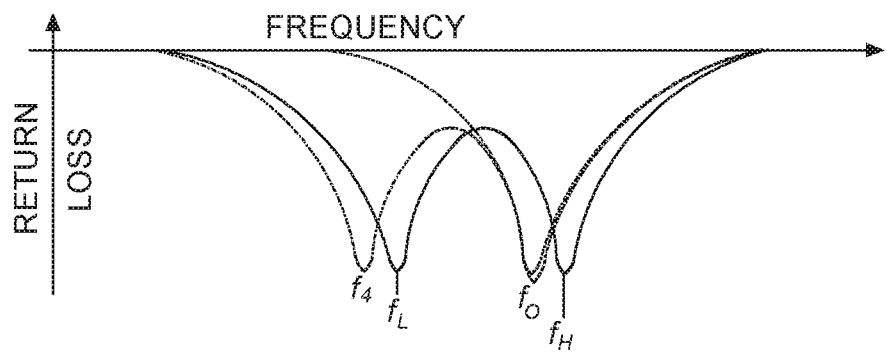

FIG. 10 illustrates a two-dimensional antenna radiation pattern associated with the modal antenna of FIG. 11. The radiation pattern may be shifted by controlling an electrical characteristic associated with at least one of the first and/or second parasitic elements 815, 818 of the modal antenna 810. For example, in some embodiments, the radiation pattern may be shifted from a first mode 822 to a second mode 824, or a third mode 826 and so forth.

FIG. 11 illustrates an example frequency plot of the modal antenna of FIG. 11 according to example aspects of the present disclosure. The frequency of the antenna can be shifted by controlling an electrical characteristic associated with at least one of the first and/or second parasitic elements 815, 818 of the modal antenna 810. For example, a first frequency ($f_0$) of the antenna may be achieved when the first and second parasitic elements are switched "Off"; the frequencies ($f_L$) and ($f_H$) may be produced when the second parasitic is shorted to ground; and the frequencies ($f_4$; $f_0$) may be produced when the first and second parasitic elements are each shorted to ground. It should be understood that other configurations are possible within the scope of this disclosure. For example, more or fewer parasitic elements may be employed. The positioning of the parasitic elements may be altered to achieve additional modes that may exhibit different frequencies and/or combinations of frequencies.

FIGS. 9-11 depict one example modal antenna having a plurality of modes for purposes of illustration and discussion. Those of ordinary skill in the art, using the disclosures provided herein, will understand that other modal antennas and/or antenna configurations can be used without deviating from the scope of the present disclosure.

While the present subject matter has been described in detail with respect to specific example embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. An antenna system for use distributing over the air (OTA) content, the antenna system comprising:
    a network access point; and
    an OTA antenna system configured to receive an OTA signal associated with media content, the OTA signal comprising a VHF signal or a UHF signal, the OTA antenna system coupled to the network access point via a universal serial bus (USB) connection,
    wherein the network access point comprises one or more processors and one or more memory devices, the one or more memory devices storing computer-readable instructions that when executed by the one or more processors cause the one or more processors to perform operations, the operations comprising:
        receiving a signal associated with the media content from the OTA antenna system via the USB connection; and
        communicating the media content via a network communication link to one or more client devices,
    wherein the OTA antenna system comprises a modal antenna configurable in a plurality of antenna modes, each antenna mode associated with a distinct radiation pattern or polarization, and
    wherein the operations further comprise:
        communicating a control signal from the network access point to the OTA antenna system via the USB connection to configure the modal antenna in a selected mode of the plurality of antenna modes.

2. The antenna system of claim 1, wherein the network access point is configured to determine the selected mode based at least in a part on a channel quality indicator associated with receiving an OTA signal associated with a channel via the modal antenna.

3. The antenna system of claim 1, wherein the network communication link is a wireless communication link.

4. The antenna system of claim 1, wherein the network communication link is an 802.11 network communication link.

5. The antenna system of claim 1, wherein the one or more client devices comprise a smartphone or tablet connected to the network access point via the network communication link.

6. The antenna system of claim 1, wherein the OTA antenna system comprises:
    a tuner configured to select one or more channels of operation for receiving OTA signals for the modal antenna.

7. The antenna system of claim 6, wherein the OTA antenna system comprises a demodulator configured to demodulate the OTA signal to generate the signal associated with the media content.

8. The antenna system of claim 1, wherein the modal antenna comprises:
    a first radiating element;
    a first parasitic element adjacent to the first radiating element;
    a first active element coupled to the first parasitic element configured to open, short, or reactively tune the first parasitic element.

9. The antenna system of claim 8, wherein the modal antenna further comprises:
    a second radiating element;
    a second parasitic element adjacent to the first radiating element;
    a second active element coupled to the first parasitic element configured to open, short, or reactively tune the second parasitic element.

10. The antenna system of claim 9, wherein the first radiating element is connected to the second radiating element.

11. A method for distributing over the air (OTA) content over a network, comprising:
    receiving, at a network access point, a signal associated with media content from an OTA antenna system via a universal serial bus (USB) connection, the media content associated with an OTA signal received at the OTA antenna system; and
    communicating, by the network access point, the media content to one or more client devices via a network communication link,
    wherein the OTA antenna system comprises a modal antenna configurable in a plurality of antenna modes, each antenna mode associated with a distinct radiation pattern or polarization, and
    wherein the method further comprises:
        communicating, by the network access point, a control signal from the network access point to the OTA antenna system via the USB connection to configure the modal antenna in a selected mode of the plurality of antenna modes.

12. The method of claim 11, further comprising:
determining a selected mode of the plurality of antenna modes based at least in a part on a channel quality indicator associated with receiving an OTA signal associated with a channel via the modal antenna.

13. The method of claim 11, wherein determining a selected mode comprises:
accessing a database of channel quality indicators for each of the plurality of antenna modes for each of a plurality of channels; and
determining a selected mode based at least in part on the database of channel quality indicators.

14. The method of claim 13, wherein the database is stored in the one or more memory devices of the network access point.

15. The method of claim 13, further comprising:
obtaining, by the network access point, computer-readable instructions to implement operations of determining a selected mode of the plurality of antenna modes based at least in part on a channel quality indicator associated with receiving an OTA signal associated with a channel via the modal antenna; and
communicating, by the network access point, the control signal from the network access point to the OTA antenna system via the USB connection to configure the modal antenna in the selected mode of the plurality of antenna modes, when the OTA antenna system is connected to the network access point via the USB connection.

16. The method of claim 11, wherein communicating, by the network access point, media content associated with the OTA signal to one or more client devices via a network communication link comprises communicating, by the network accessing point, media content associated with the OTA signal to one or more client devices via a wireless network communication link.

17. The method of claim 11, wherein communicating, by the network access point, media content associated with the OTA signal to one or more client devices via a network communication link comprises communicating, by the network accessing point, media content associated with the OTA signal to one or more client devices via an 802.11 network communication link.

18. The method of claim 11, wherein the one or more client devices comprise a smartphone or tablet connected to the network access point via the network communication link.

19. The method of claim 11, further comprising:
obtaining, by the network access point, computer-readable instructions to implement an operation of receiving, at a network access point, a signal associated with media content from an OTA antenna system via a universal serial bus (USB) connection when the OTA antenna system is connected to the network access point via the USB connection.

* * * * *

UNITED STATES PATENT AND TRADEMARK OFFICE
CERTIFICATE OF CORRECTION

PATENT NO. : 11,283,196 B2  
APPLICATION NO. : 16/910536  
DATED : March 22, 2022  
INVENTOR(S) : Dhaval Bhavnagari et al.

Page 1 of 1

It is certified that error appears in the above-identified patent and that said Letters Patent is hereby corrected as shown below:

On the Title Page

Item [56] Provisional Application No. 61/635,277 delete "June 8, 2019." insert --June 28, 2019.--.

Signed and Sealed this  
Sixteenth Day of August, 2022

Katherine Kelly Vidal  
*Director of the United States Patent and Trademark Office*